(12) United States Patent
Thalanany et al.

(10) Patent No.: US 7,558,736 B2
(45) Date of Patent: Jul. 7, 2009

(54) SYSTEM AND METHOD FOR PROVIDING TALKER ARBITRATION IN POINT-TO-POINT/GROUP COMMUNICATION

(75) Inventors: Sebastian Thalanany, Buffalo Grove, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 821 days.

(21) Appl. No.: 10/750,020

(22) Filed: Dec. 31, 2003

(65) Prior Publication Data

US 2005/0149333 A1 Jul. 7, 2005

(51) Int. Cl.
| | |
|---|---|
| G10L 21/00 | (2006.01) |
| H04B 7/00 | (2006.01) |
| H04M 3/42 | (2006.01) |
| H04W 4/00 | (2006.01) |
| H04W 72/00 | (2006.01) |
| H04L 12/16 | (2006.01) |

(52) U.S. Cl. .................. 704/275; 704/270; 455/518; 455/519; 455/416; 455/435.3; 455/464; 370/259; 370/260; 379/202.01; 379/203.01; 379/204.01

(58) Field of Classification Search .............. 704/270, 704/275; 455/519, 416, 435.3, 464; 379/158, 379/202.01; 370/259, 260
See application file for complete search history.

(56) References Cited

U.S. PATENT DOCUMENTS

| | | | | |
|---|---|---|---|---|
| 5,550,893 | A | * | 8/1996 | Heidari .................... 455/553.1 |
| 5,953,049 | A | * | 9/1999 | Horn et al. ................ 348/14.09 |
| 6,044,150 | A | * | 3/2000 | Rigstad et al. ............ 379/387.02 |
| 6,154,530 | A | * | 11/2000 | Letellier ................. 379/142.06 |
| 6,275,806 | B1 | | 8/2001 | Pertrushin ................ 704/272 |
| 6,563,804 | B1 | * | 5/2003 | Iyer et al. .................. 370/296 |
| 6,912,401 | B2 | * | 6/2005 | Rosen et al. ................ 455/518 |
| 6,922,547 | B2 | * | 7/2005 | O'Neill et al. ............... 455/17 |
| 6,999,783 | B2 | * | 2/2006 | Toyryla et al. .............. 455/519 |
| 7,079,857 | B2 | * | 7/2006 | Maggenti et al. ............ 370/447 |
| 7,233,580 | B2 | * | 6/2007 | Moss et al. ................ 370/260 |
| 2002/0085697 | A1 | * | 7/2002 | Simard et al. .......... 379/202.01 |
| 2003/0018472 | A1 | * | 1/2003 | Hershkovits et al. ........ 704/251 |
| 2003/0235184 | A1 | * | 12/2003 | Dorenbosch et al. ........ 370/352 |

(Continued)

OTHER PUBLICATIONS

Dommel, H. and Garcia-Luna-Aceves, J. J. 1997. Floor control for multimedia conferencing and collaboration. Multimedia Syst. 5, 1 (Jan. 1997), 23-28 DOI= http://dx.doi.org/10.1007/s005300050040.*

(Continued)

*Primary Examiner*—David R Hudspeth
*Assistant Examiner*—Paras Shah
(74) *Attorney, Agent, or Firm*—Leydig, Voit & Mayer, Ltd.

(57) ABSTRACT

One embodiment of the invention is based on a facilitation of the natural dynamics associated with face to face conversation, where the amplitude of a speaker's voice is often used to gain floor control. This capability advantageously allows a user who is intending to speak to interrupt a user who currently has floor control. By basing talker arbitration at least partially on the amplitude of the speaker's voice, the invention removes the need for a user to push a separate button on the handset before the commencement of speech.

24 Claims, 3 Drawing Sheets

U.S. PATENT DOCUMENTS

2004/0100915 A1* 5/2004 Berler et al. ............... 370/259
2004/0174830 A1* 9/2004 Koskelainen et al. ........ 370/260
2008/0316944 A1* 12/2008 Nachum .................... 370/260

OTHER PUBLICATIONS

Prasad, Venkatesha R and Jamadagni, HS and Shankar, HN (2003) On the Problem of Specifying the Number of Floors for a Voice-Only Conference on Packet Networks. In Proceedings International Conference on Information Technology: Research and Education, 2003. ITRE2003, pp. 22-26, New Jersey,USA.*

3GPP2 S.R0037-0 v3.0, "$3^{rd}$ Generation Partnership Project 2 '3GPP2' for IP Network Architecture Model for cdma2000 Spread Spectrum Systems", *3GPP2 and its Organizational Partners*, Aug. 21, 2003, 52 pgs.

3GPP2 S.R0037-0 , "$3^{rd}$ Generation Partnership Project 2 '3GPP2' for IP Network Architecture Model for cdma2000 Spread Spectrum Systems", *3GPP2 and its Organizational Partners*, May 14, 2002, 50 pgs.

J. Rosenberg et al, "SIP: Session Initiation Protocol", *The Internet Society*, 2002, 269 pgs.

3GPP2 C.S0014-0, "$3^{rd}$ Generation Partnership Project 2 '3GPP2' for Enhanced Variable Rate Codec (EVRC)", *3GPP2 and its Organizational Partners*, 1998, 139 pgs.

3GPP2 C.S0014-0-1, "$3^{rd}$ Generation Partnership Project 2 '3GPP2' for Enhanced Variable Rate Codec, Speech Service Option 3 for Wideband Spread Spectrum Systems", *3GPP2 and its Organizational Partners*, Dec. 1999, 6 pgs.

3GPP2 C.S0014-0-2, "$3^{rd}$ Generation Partnership Project 2 '3GPP2' for Enhanced Variable Rate Codec, Speech Service Option 3 for Wideband Spread Spectrum Systems", *3GPP2 and its Organizational Partners*, Dec. 1999, 17 pgs.

Allison Woodruff and Paul M. Aoki, "How Push-To-Talk Makes Talk Less Pushy", Proceedings of the 2003 International ACM SIG-GROUP conference on Supporting Group Work, *ACM Press*, New York, New York, 2003, 10 pgs.

* cited by examiner

SYSTEM AND METHOD FOR PROVIDING TALKER ARBITRATION IN POINT-TO-POINT/GROUP COMMUNICATION

FIELD OF THE INVENTION

The present invention relates generally to communication systems, and more particularly, to a system and method for arbitrating between speakers in a half-duplex communication system.

BACKGROUND OF THE INVENTION

Press-to-talk over Cellular (PoC) makes two-way radio service possible over a cellular network and is capable of providing direct one-to-one and one-to-many voice communications service to users of cellular telephones or other mobile communications devices. Calls are started by pressing a button (e.g., a talk button) on the cellular telephone. Press-to-talk over Cellular is based on one-way (half-duplex) communications—while one person speaks, the other(s) listen. When the person who is speaking releases the button, transmission stops and another person can press their talk button to gain the floor. Thus, by pressing the talk button, speakers can take turns responding to each other.

Conventional press-to-talk systems operate on a first-come first-served basis. Since the communications are half-duplex, if person A presses his talk button while person B is speaking, person A's microphone will not be activated, and person B will control the floor as long as his talk button is depressed. Thus, person B cannot be interrupted. Once person B releases his talk button, another speaker (the first speaker to activate his talk switch) can take the floor by pressing his talk button.

In the current usage of a PoC service, participants in a PoC are required to use a tactile scheme to assert floor control to acquire a talking status. The acquisition of the floor or talking status is referred to as talker arbitration. The use of a tactile scheme is not a natural step in the semantics of human conversation, whether in a point-to-point conversation or in a group conversation. A tactile scheme, whether in the form of a dedicated push button on a wireless mobile communication device or in the form of a programmable key on the user interface of a wireless mobile communication device, is not convenient in the context of natural human conversation.

Accordingly, there is a need for a system and method for talker arbitration that is based on a facilitation of the natural dynamics associated with a face-to-face conversation. Further, there is a need for a system and method for talker arbitration that removes the need for a user to push a separate button on the handset before commencement of speech, which is not a natural component of face-to-face conversations.

SUMMARY OF THE INVENTION

A system and method for providing talker arbitration in a half-duplex communication system such as a Press-to-talk over Cellular (PoC) system. The system and method can be used to allow a user to interrupt another user who currently has floor control. The system and method also removes the need for a user to push a separate button on the handset before commencement of speech, which is not a natural component of face-to-face conversations.

One embodiment of the invention is based on a facilitation of the natural dynamics associated with face to face conversation, where the amplitude of a speaker's voice is often used to gain floor control. This capability advantageously allows a user who is intending to speak to interrupt a user who currently has floor control. By basing talker arbitration at least partially on the amplitude of the speaker's voice, the invention removes the need for a user to push a separate button on the handset before the commencement of speech.

One embodiment of the invention is a method for talker arbitration. The method comprises receiving a speech energy level of a current talker in a communication session, receiving a speech energy level of a prospective talker, selecting the prospective talker if the speech energy level of the prospective talker is higher than the speech energy level of the current talker, and granting the selected prospective talker floor control of the communication session. By selecting and granting the prospective talker floor control based on the prospective talker's speech energy level, the present invention removes the need for the prospective talker to push a button on a communication device.

In a related embodiment, the method further comprises receiving a static priority level of the current talker and receiving a static priority level of the prospective talker. The selection of the prospective talker can be based on both the speech energy level and the static priority level of the prospective talker in comparison to the speech energy level and the static priority level of the current talker. In another related embodiment, the method further comprises receiving a dynamic priority level of the current talker and receiving a dynamic priority level of the prospective talker. The prospective talker can be prevented from gaining floor control if, for example, the number of times the prospective talker has been granted floor control exceeds a threshold.

One embodiment of the invention is a system for talker arbitration. The system comprises a first mobile station associated with a current talker in a communication session, a second mobile station associated with a prospective talker, and a server, connected to the first and second mobile stations. The server is adapted to enable one of the first and second mobile stations to transmit based on speech energy levels respectively received from the first and second mobile stations.

In a related embodiment, the server is adapted to receive respective static priority levels of the current talker and said prospective talker. The server can enable one of the first and second mobile stations to transmit based on the speech energy levels respectively received from the first and second mobile stations, and further based on the respective static priority levels of the current talker and the prospective talker. In another related embodiment, the server is adapted to maintain respective dynamic priority levels of the current talker and the prospective talker. The server can prevent the prospective talker from gaining floor control if, for example, the number of times the prospective talker has been granted floor control exceeds a threshold.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which.

DETAILED DESCRIPTION

Figure 1:
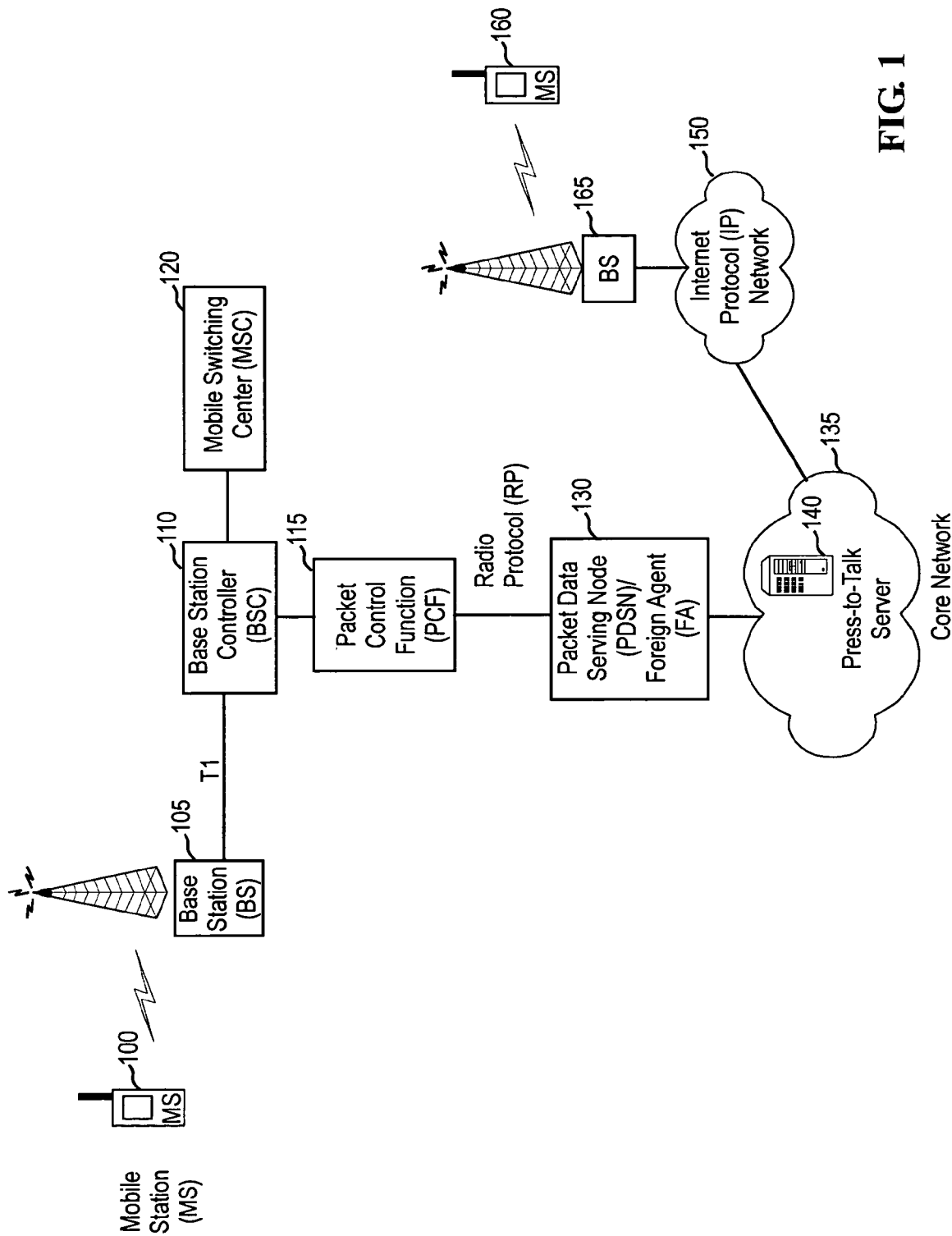
FIG. 1 is a schematic illustration of a cellular network in accordance with the present invention.

FIG. 1 schematically illustrates a representative environment of the present invention. A first mobile station 100 (e.g., a Press-to-talk over Cellular mobile phone) is wirelessly connected to a first base station 105 via a first radio frequency (RF) network (e.g., a cdma2000 network). The first base station 105 is connected to a base station controller (BSC) 110, typically via a wire-line, such as a T1 line. The base station controller 110 is configured for connecting to and controlling multiple base stations 105. The base station controller 110 is connected to a Packet Control Function (PCF) 115 and to a Mobile Switching Center (MSC) 120.

The PCF 115 is connected to a packet data serving node (PDSN) 130 via Radio Protocol (RP). The PDSN 130 is connected to a core network 135, including a Press-to-talk over Cellular (PoC) server 140, typically via a wire-line. The core network 135 is connected to a communications network (e.g., the Internet) 150.

A second mobile station 160 (e.g., a Press-to-talk over Cellular mobile phone) is wirelessly connected to a second base station 165 via a second radio frequency network. In the illustrated embodiment, the second radio frequency network is not necessarily a cdma2000 network, but can utilize another type of wireless access technology. The second base station 165 is connected to the communications network 150 via a number of intermediate devices (not shown) to allow the second mobile station 160 to communicate with the first mobile station 100.

A Radio Access Network (RAN) protocol is used for transporting traffic from base stations 105 to the base station controller 110, between base station controllers (not shown), and between the base station controller 110 and an associated mobile switching center 120. While the representative environment has been described in the context of a Press-to-talk over Cellular system using a cdma2000 network, the present invention can be used to advantage in any half-duplex communications network.

Figure 2:
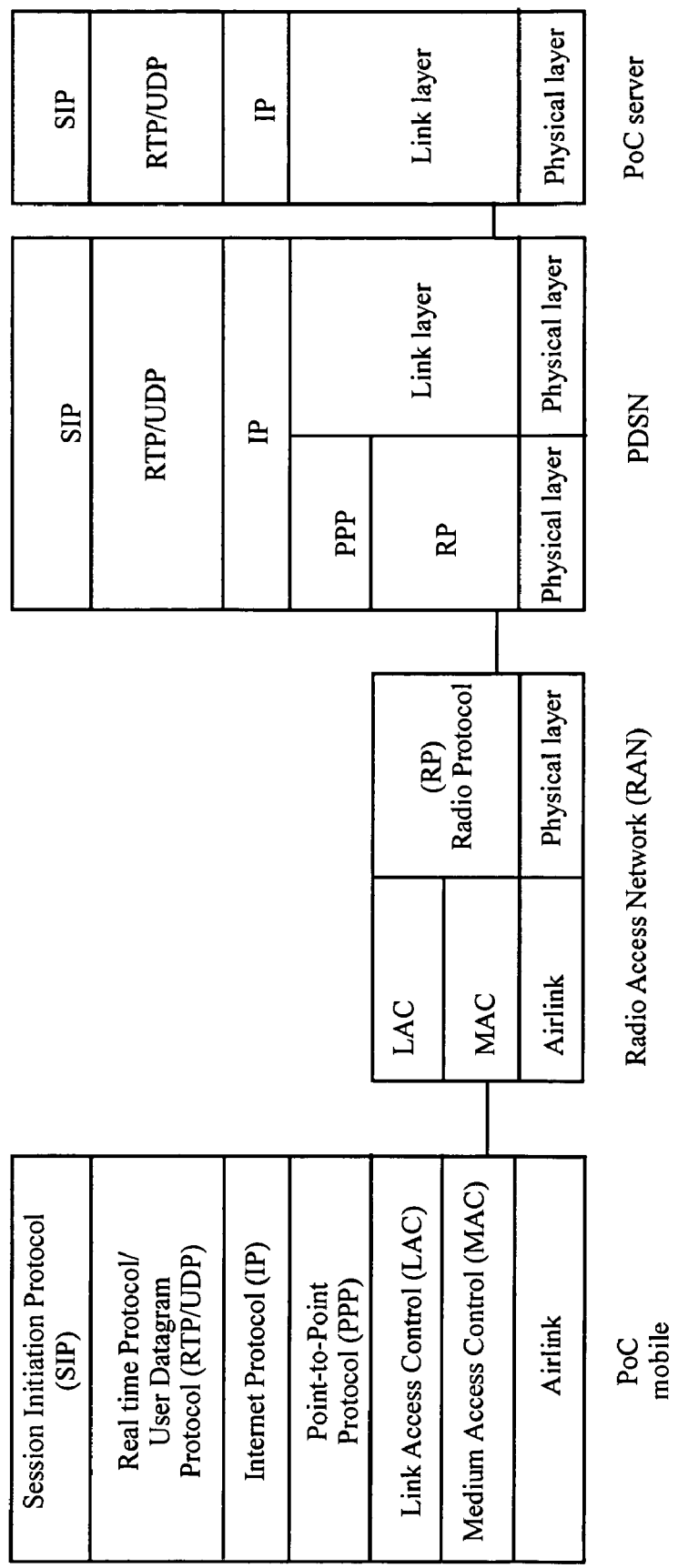
FIG. 2 is a block diagram illustrating a protocol reference model for a network in accordance with the present invention.

FIG. 2 illustrates a protocol reference model for a cdma2000 based access network in accordance with the present invention. The physical layer and link layer protocols would be different for other wireless access technologies. For interoperability, the protocols at the network layer and above are based on open standards. In this protocol model, Press-to-talk over Cellular (PoC) call control is performed via the Session Initiation Protocol (SIP), and the PoC media streams are conveyed over the Real Time Protocol (RTP), User Datagram Protocol (UDP) and Internet Protocol (IP).

The protocol stack for the mobile station 100, radio access network, packet data serving node 130 and Press-to-talk over Cellular (PoC) server 140 are shown in FIG. 2. At the top of the protocol stack is the Session Initiation Protocol (SIP) which provides for call control between the mobile station 100, the PDSN 130 and the PoC server 140. The PoC data streams are then conveyed between the mobile station 100, the PDSN 130 and the PoC server 140 via RTP/UDP/IP.

At the link layer, the mobile station 100 communicates with the PDSN 130 via the point-to-point protocol (PPP), and with the radio access network (RAN) via the link access control (LAC) and the medium access control (MAC) protocols. At the physical layer, the mobile station 100 communicates with the radio access network via the Airlink protocol.

The radio access network (RAN) communicates with the PDSN 130 via radio protocol (RP) at the link layer, and via any number of protocols at the physical layer depending on the physical interconnections between the RAN and the PDSN 130.

By employing the protocol model, communications between the mobile station 100 and the PoC server 140 may be carried out independent of the types of physical interconnections therebetween. The PoC server 140 can grant the PoC session floor to a participant mobile station 100 based on the participant's speech energy level as carried in the RTP payload, and optionally, based on the participant's dynamic and/or static priority levels.

Figure 3:
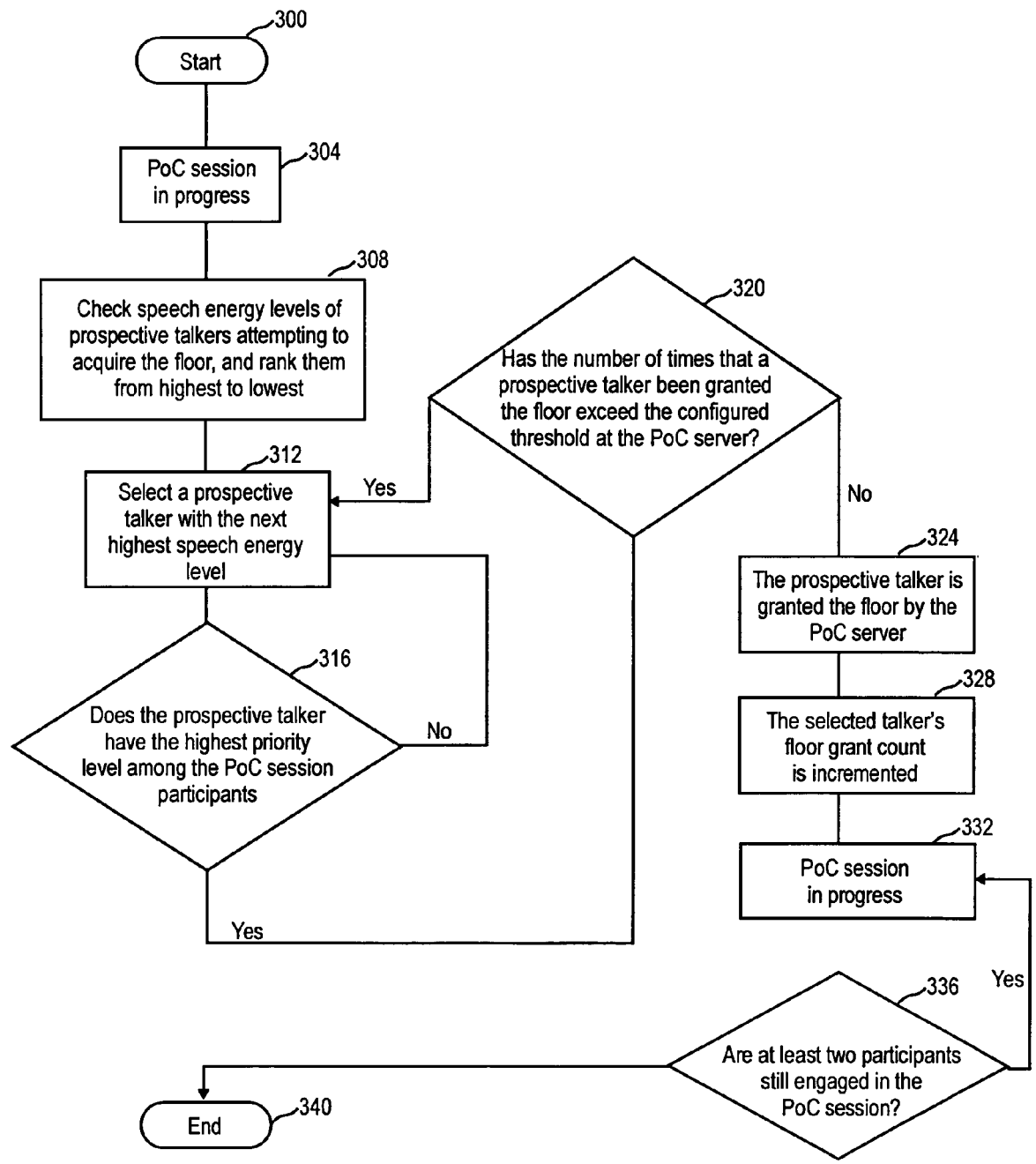
FIG. 3 is a flow diagram illustrating a method for talker arbitration in accordance with the present invention.

FIG. 3 illustrates a flow diagram of a process for talker arbitration in accordance with the present invention. The process allows a participant in a PoC session to assert and acquire control of the floor based, at least in part, on the participant's speech energy level. The process includes configurable options whereby a PoC server can grant a PoC session floor based on a dynamic priority level and a static priority level. These configurable options can be applied in conjunction with the PoC participant's speech energy level for talker arbitration. This has the advantage of facilitating a fair scheme for talker arbitration while enhancing user experience.

The process starts at step 300. In step 304, the PoC session is in progress. In step 308, the process checks the speech energy levels of prospective talkers who are attempting to gain the floor and ranks the prospective talkers in order from highest to lowest based on their speech energy levels. In one embodiment, the prospective talkers include the current talker, if one of the PoC session participants currently has floor control.

In one embodiment, the speech energy level is encoded based on a negotiated voice codec in use in a PoC session. In a cdma2000 PoC session, for example, an Enhanced Variable Rate Coding (EVRC) codec is a typical example of an applicable codec since it is designed for efficient coding and good Mean Opinion Score (MOS) for delivery over low bandwidth wireless links. In other PoC sessions, other algorithms may be used to extract the speech energy level of a talker based on the specific codec in use in the PoC session.

Then, in step 312, the process selects a prospective talker with the highest (or next highest) speech energy level. By selecting prospective talkers based on the speech energy level, the present invention allows a participant in a PoC session to assert and acquire control of the floor based on the speech energy level of the participant. The present invention thus avoids the unnatural tactile scheme currently in use in PoC service.

In optional step 316, the process determines whether the prospective talker has the highest priority among the PoC session participants. The priority level can, for example, be based on a weighted function of the speech energy level and the static priority level of a PoC session participant. The weighted function may, for example, allow a PoC session participant with a slightly lower speech energy level, but a higher static priority level to have access to the floor. In one embodiment, the static priority level assigned to a PoC session participant may be based on, for example, the PoC session participant's subscription profile.

If the prospective talker does not have the highest priority level, (No in step 316) the process returns to step 312 and selects the prospective talker with the next highest speech energy level. If the prospective talker does have the highest priority level, (Yes in step 316), the process continues to step 320.

In step 320, the process determines whether the number of times that a prospective talker has been granted the floor exceeds a threshold set at the PoC server. Comparing the number of times that a prospective talker has been granted the floor to a threshold number thus allows the present invention to avoid a talker having a high speech energy level from dominating the conversation. If the number of times the prospective talker has been granted floor control exceeds the threshold, (Yes in step 320) the process returns to step 312 and selects the prospective talker with the next highest speech energy level. If not, (No in step 320), the process continues to step 324 wherein the prospective talker is granted the floor by the PoC server. In step 328, the selected talker's floor grant count is incremented. In step 332, the PoC session is in progress as the talker maintains the floor. If there are prospective talkers while the current talker has the floor, the process continues to step 308.

In step 336, the process determines whether there are at least two participants still engaged in the PoC session. If so, (Yes in step 336), the process returns to step 332. If not (No in step 336), there are not at least two participants engaged in the PoC session and the process ends at step 340.

In one embodiment of the present invention, the selection of a particular talker for floor control from among a number of prospective talkers can be based on the prospective talkers' speech energy levels. However, since some PoC session participants may naturally speak louder than others, the present invention advantageously provides an override mechanism to avoid the same PoC session participant always being selected and given floor control.

In one embodiment, the PoC server 140 can assign a dynamic priority level to a PoC session participant based on the number of times that the PoC participant has been granted the floor. The dynamic priority level assigned to a PoC session participant can be made inversely proportional to the number of times that the PoC session participant has been granted the floor previously. Thus, as each time a particular PoC session participant gains floor control, the PoC session participant's dynamic priority level is reduced. In one embodiment, selection of a particular talker for receipt of floor control can be made based on a weighted function of the speech energy level and the dynamic priority level of the prospective talkers.

In one embodiment, the PoC server 140 can assign a static priority level to a PoC session participant based on the PoC session participant's subscription profile. For example, a team leader may be given a higher static priority level than the other team members. Selection of a particular talker for receipt of floor control can be made based on the speech energy level and the static priority level of the prospective talkers. In a related embodiment, selection of a particular talker for receipt of floor control can be made based on a weighted function of the speech energy level and the static priority level of the prospective talkers.

By using the dynamic priority level and/or the static priority level in conjunction with the speech energy level, the present invention can allow floor control to pass from one session participant to another based on the natural dynamics associated with face-to-face conversations.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. In a half-duplex cellular communication system, a method for talker arbitration, comprising: receiving speech energy levels corresponding respectively to a current talker and a prospective talker in a half-duplex cellular communication session, said current and prospective talkers automatically requesting floor control by commencing speech, said current talker having floor control; receiving dynamic priority levels corresponding respectively to said current and prospective talkers; selecting said prospective talker based on comparing said speech energy level of said prospective talker to said speech energy level of said current talker by weighting said speech energy levels by said corresponding dynamic priority levels; wherein said step of selecting further comprises selecting said prospective talker if said weighted speech energy level of said prospective talker is higher than said weighted speech energy level of said current talker; and granting said selected prospective talker floor control of said half-duplex cellular communication session; wherein the dynamic priority level for each talker is inversely proportional to a number of times said talker has been granted floor control and independent from a number of times other talkers have been granted floor control.

2. A method in accordance with claim 1, wherein said step of receiving said speech energy level of said current talker comprises receiving, from a mobile station of said current talker, said speech energy level of said current talker.

3. A method in accordance with claim 1, wherein said step of receiving said speech energy level of said prospective talker comprises receiving, from a mobile station of said prospective talker, said speech energy level of said prospective talker.

4. A method in accordance with claim 1, wherein said speech energy level of said current talker is encoded based on a voice codec in use in said communication session.

5. A method in accordance with claim 1, further comprising:
   receiving a static priority level of said current talker;
   receiving a static priority level of said prospective talker;
   wherein said step of selecting further comprises selecting said prospective talker based on weighting each of said speech energy levels by each of said corresponding static priority levels associated with said current and prospective talkers and comparing said weighted speech energy levels.

6. A method in accordance with claim 5, wherein said static priority level of said current talker and said static priority level of said prospective talker are based on respective subscription profiles of said current talker and said prospective talker.

7. A method in accordance with claim 1, wherein said prospective talker is prevented from obtaining floor control if said number of times said prospective talker has been granted floor control exceeds a predetermined threshold set at a server.

8. A method in accordance with claim 1, further comprising:
   receiving a speech energy level of a second prospective talker;
   receiving a dynamic priority level corresponding to said second prospective talker;
   weighting said speech energy level of said second prospective talker by said dynamic priority level of said second prospective talker;
   wherein said step of selecting further comprises selecting said prospective talker based on comparing said weighted speech energy level of said prospective talker to said weighted speech energy level of said current talker and said weighted speech energy level of said second prospective talker.

9. A method in accordance with claim 8, wherein said step of selecting further comprises selecting said prospective talker if said weighted speech energy level of said prospective talker is higher than both said weighted speech energy level of said current talker and said weighted speech energy level of said second prospective talker.

10. A method in accordance with claim 8, wherein said step of receiving said speech energy level of said second prospective talker comprises receiving, from a mobile station of said second prospective talker, said speech energy level of said second prospective talker.

11. A method in accordance with claim 5, further comprising:
   receiving a static priority level of said second prospective talker;
   weighting said speech energy level of said second prospective talker by said static priority level of said second prospective talker;
   wherein said step of selecting further comprises selecting said prospective talker based on comparing said weighted speech energy level of said prospective talker to said weighted speech energy level of said current talker and said weighted speech energy level of said second prospective talker.

12. A half-duplex communication system for providing talker arbitration, comprising:
   a first mobile station associated with a current talker in a half-duplex cellular communication session;
   a second mobile station associated with a prospective talker; and
   a server, connected to said first and second mobile stations, said server adapted to enable one of said first and second mobile stations to transmit based on speech energy levels respectively received from said first and second mobile stations, said speech energy levels weighted by dynamic priority levels respectively maintained for said current and prospective talkers, said current and prospective talkers automatically requesting floor control by commencing speech;
   wherein the dynamic priority level for each talker is inversely proportional to a number of times said talker has been granted floor control and independent from a number of times other talkers have been granted floor control.

13. A system in accordance with claim 12, wherein said server is a press-to-talk over cellular server.

14. A system in accordance with claim 12, wherein said server is adapted to enable said second mobile station to transmit if said weighted speech energy level associated with said second mobile station is higher than said weighted speech energy level associated with said first mobile station.

15. A system in accordance with claim 12, wherein said speech energy levels are encoded based on a voice codec in use in said communication session.

16. A system in accordance with claim 12, wherein said server is adapted to receive respective static priority levels of said current talker and said prospective talker.

17. A system in accordance with claim 16, wherein said server is adapted to enable one of said first and second mobile stations to transmit based on said speech energy levels respectively received from said first and second mobile stations, said speech energy levels weighted by said respective static priority levels of said current talker and said prospective talker.

18. A system in accordance with claim 16, wherein said respective static priority levels of said current talker and said prospective talker are based on respective subscription profiles of said current talker and said prospective talker.

19. A system in accordance with claim 12, wherein said server is adapted to prevent said prospective talker from obtaining floor control if said number of times said prospective talker has been granted floor control exceeds a predetermined threshold set at a server.

20. A system in accordance with claim 12, further comprising a third mobile station associated with a second prospective talker, said server adapted to allow said third mobile station to transmit if a speech energy level associated with said third mobile station and weighted by a dynamic priority level maintained by said server for said second prospective talker is higher than both said weighted speech energy level associated with said first mobile station and said weighted speech energy level associated with said second mobile station.

21. A system in accordance with claim 20, wherein said server is adapted to receive static priority levels corresponding to each of said current talker, first prospective talker, and second prospective talker.

22. A system in accordance with claim 21, wherein said server is adapted to enable one of said first, second and third mobile stations to transmit based on weighting said speech energy levels respectively received from said first, second and third mobile stations by said respective static priority levels of said current talker, said prospective talker and said second prospective talker.

23. A system in accordance with claim 20, wherein said server is adapted to prevent said second prospective talker from obtaining floor control if said number of times said second prospective talker has been granted floor control exceeds a predetermined threshold set at a server.

24. In a half duplex cellular communication system, a method for talker arbitration, comprising:
   measuring a speech energy level of each of a plurality of prospective talkers in a half-duplex cellular communication session, each of said plurality of prospective talkers automatically requesting floor control by commencing speech;
   determining a static priority level of each of said plurality of prospective talkers;
   determining a dynamic priority level of each of said plurality of prospective talkers;
   weighting said speech energy level of each of said plurality of prospective talkers by said static and said dynamic priority levels of each of said plurality of prospective talkers;
   selecting one of said plurality of prospective talkers for floor control based on identifying a highest one of said weighted speech energy levels of each of said plurality of prospective talkers; and
   granting said selected one of said plurality of prospective talkers floor control of said half duplex cellular communication session;
   wherein said dynamic priority level of each of said plurality of prospective talkers is inversely proportional to a number of times said talker has been granted floor control and independent from a number of times other talkers have been granted floor control.

* * * * *